(12) United States Patent
Dominiak et al.

(10) Patent No.: US 6,986,804 B2
(45) Date of Patent: Jan. 17, 2006

(54) COMBINATION FILTER FOR FILTERING FLUIDS

(75) Inventors: Klaus Dominiak, Oer-Erkenschwick (DE); Frank Koehler, Essen (DE); Nicolai Bochynek, Iserlohn (DE); Marcus Lotgerink-Bruinenberg, Hagen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/472,785

(22) PCT Filed: Apr. 5, 2002

(86) PCT No.: PCT/EP02/03777

§ 371 (c)(1), (2), (4) Date: Sep. 22, 2003

(87) PCT Pub. No.: WO02/081061

PCT Pub. Date: Oct. 17, 2002

(65) Prior Publication Data

US 2004/0112213 A1    Jun. 17, 2004

(51) Int. Cl.
*B01D 29/07* (2006.01)
*B01D 46/12* (2006.01)
*B01D 53/04* (2006.01)

(52) U.S. Cl. ............... 95/90; 95/70; 95/143; 95/287; 96/55; 96/74; 96/134; 96/142; 96/153; 55/385.3; 55/521; 55/528

(58) Field of Classification Search ........... 95/70, 95/90, 143, 146, 273, 287; 96/55, 74, 108, 96/134–136, 142, 147, 153, 154; 55/385.3, 55/521, 527, 528
See application file for complete search history.

(56) References Cited

U.S. PATENT DOCUMENTS

| | | | | |
|---|---|---|---|---|
| 2,038,071 A | * | 4/1936 | Wilhelm | 96/118 |
| 2,643,735 A | * | 6/1953 | Logsdon | 55/488 |
| 2,653,676 A | * | 9/1953 | Breckheimer | 55/489 |
| 2,764,257 A | * | 9/1956 | Brixius | 55/489 |
| 3,006,346 A | * | 10/1961 | Golding | 131/332 |
| 3,022,861 A | * | 2/1962 | Harms | 55/500 |
| 3,135,174 A | * | 6/1964 | Gewiss | 493/435 |

(Continued)

FOREIGN PATENT DOCUMENTS

EP        0 383 236        2/1989

(Continued)

*Primary Examiner*—Robert H. Spitzer
(74) *Attorney, Agent, or Firm*—William J. Bond

(57) ABSTRACT

The present invention provides a combination filter for filtering fluids comprising a flow channel particulate filtration media having a first face and a second face and a gas adsorbing filtration media. The flow channel particulate filtration media comprises a plurality of flow channels directed in flow direction and defined by inner surfaces. The flow channels having inlet openings through the first face and outlet openings through the second face of the flow channel particulate filtration media. The inner surfaces of said flow channels at least in part are provided with structures protruding therefrom and forming or extending into the flow channels or an electrical charge or a combination of both. The said gas adsorbing filtration media comprises a pad having a first face and a second face and width and length dimensions orthogonal with respect to each other and each individually to the flow direction and having a thickness dimension in flow direction. The pad comprising a layer extending substantially perpendicular to the flow direction across the width and length dimensions of the pad.

22 Claims, 6 Drawing Sheets

U.S. PATENT DOCUMENTS

| | | | |
|---|---|---|---|
| 3,594,863 A | 7/1971 | Erb | |
| 3,998,916 A | 12/1976 | van Turnhout | |
| 4,215,682 A | 8/1980 | Kubik et al. | |
| RE30,782 E | 10/1981 | van Turnhout | |
| RE31,285 E | 6/1983 | van Turnhout et al. | |
| 4,418,662 A * | 12/1983 | Engler et al. | 96/133 |
| 4,592,815 A | 6/1986 | Nakao | |
| 4,668,558 A | 5/1987 | Barber | |
| 4,725,411 A * | 2/1988 | Cornelison | 422/180 |
| 4,775,310 A | 10/1988 | Fischer | |
| 4,950,549 A | 8/1990 | Rolando et al. | |
| 5,025,052 A | 6/1991 | Crater et al. | |
| 5,057,710 A | 10/1991 | Nishiura et al. | |
| 5,069,404 A | 12/1991 | Bouchard | |
| 5,077,870 A | 1/1992 | Melbye et al. | |
| 5,078,925 A | 1/1992 | Rolando et al. | |
| 5,099,026 A | 3/1992 | Crater et al. | |
| 5,129,929 A * | 7/1992 | Linnersten | 96/117.5 |
| 5,133,516 A | 7/1992 | Marentic et al. | |
| 5,158,030 A | 10/1992 | DuBois et al. | |
| 5,175,030 A | 12/1992 | Lu et al. | |
| 5,256,231 A | 10/1993 | Gorman et al. | |
| 5,288,298 A * | 2/1994 | Aston | 96/135 |
| 5,302,354 A * | 4/1994 | Watvedt et al. | 422/177 |
| 5,338,340 A * | 8/1994 | Kasmark et al. | 96/135 |
| 5,354,365 A * | 10/1994 | Youn | 96/135 |
| 5,405,434 A | 4/1995 | Inculet | |
| 5,472,481 A | 12/1995 | Jones et al. | |
| 5,496,507 A | 3/1996 | Angadjivand et al. | |
| 5,514,120 A | 5/1996 | Johnston et al. | |
| 5,691,846 A | 11/1997 | Benson, Jr. et al. | |
| 6,228,152 B1 * | 5/2001 | Guerin et al. | 96/135 |
| 6,280,824 B1 * | 8/2001 | Insley et al. | 428/172 |
| 6,454,839 B1 * | 9/2002 | Hagglund et al. | 96/67 |
| 6,592,655 B2 * | 7/2003 | Iriyama et al. | 96/138 |
| 2001/0052224 A1 * | 12/2001 | Gelderland et al. | 55/521 |
| 2002/0178923 A1 * | 12/2002 | Kishovich et al. | 96/135 |
| 2004/0118285 A1 * | 6/2004 | Kim et al. | 96/55 |

FOREIGN PATENT DOCUMENTS

| | | |
|---|---|---|
| EP | 0 652 803 B1 | 4/1998 |
| WO | WO 95/26802 | 10/1995 |

* cited by examiner

COMBINATION FILTER FOR FILTERING FLUIDS

TECHNICAL FIELD

The present invention relates to a combination filter system for filtering fluids, particularly gases, particularly for filtering air streaming into the passenger cabin of a vehicle.

BACKGROUND OF THE INVENTION

Combination filter systems for filtering air streaming into the passenger cabin of a vehicle are known. Such filter systems typically comprise a particulate filter media with a sorbent filter media.

For example, WO-A-95/26802 discloses a combination filter system which comprises a pleated electret charged fiber/nonwoven filter media and an active carbon particle pad. Although the active carbon particle pad exhibits good gas efficiency and/or gas capacity depending on the thickness and carbon content of the pad, the application of such an active carbon particle pad causes a high pressure drop. A high pressure drop is undesirable for vehicle cabin filter systems.

EP-A-383236 discloses an adsorber particle layer that is co-pleated with an electret charged fiber non-woven layer. Although such a combination filter has an acceptable pressure drop, the lifetime thereof is limited, i.e. the filter needs to be replaced frequently.

It is therefore desirable to further improve combination filters, in particular to increase the lifetime of such a filter without raising the pressure drop of such filter to an unacceptable level. Also, for use in motor vehicles, the filter should preferably be designed to meet safety regulations existing in the automotive industry. Further, the combination filter should preferably have the same or improved filter performance. It is furthermore preferred that the combination filter can be produced in a cost effective and easy way and can be easily and effectively installed in a motor vehicle for the purpose of filtering gaseous fluids entering the passenger cabin of such motor vehicle.

SUMMARY OF THE INVENTION

The present invention provides a combination filter for filtering fluids flowing in a flow direction, comprising
  a flow channel particulate filtration media having a first face and a second face and
  a gas adsorbing filtration media,
  wherein said flow channel particulate filtration media comprises a plurality of flow channels directed in flow direction and defined by inner surfaces, said flow channels having inlet openings through the first face and outlet openings through the second face of said flow channel particulate filtration media,
  wherein the inner surfaces of said flow channels at least in part are provided with
    structures protruding therefrom and forming the flow channels or extending into the flow channels or
    an electrical charge or
    a combination of both and
  wherein said gas adsorbing filtration media comprises a pad having a first face and a second face and width and length dimensions orthogonal to both each other and the flow direction and having a thickness dimension in flow direction, said pad having at least one portion of substantial constant thickness said portion extending over the width and length dimensions of said pad.

The combination filters according to the invention exhibit an advantageously low pressure drop over its lifetime. In other words the combination filters according to the invention show a relatively flat increase in pressure drop with loading over the lifetime of the filter, and hence, a corresponding long lifetime and high capacity.

The particulate filtration media of the present combination filter is a flow channel particulate filtration media having a relatively low increase in pressure drop with loading over the lifetime of the filter. Surprisingly, this advantage is still given if the flow channel particulate filtration media is combined with a gas adsorbing filtration media having the form of a pad which is substantially flat or even. The pad comprises a layer extending substantially perpendicular to the flow direction across the width and length dimensions of the pad. The layer has a thickness which may be substantially constant along the width and length dimensions of the pad. As an alternative, the layer comprises portions of different thicknesses in that the first or second face or both faces of the pad, e.g. is or are structured in particular corrugated, so as to increase the surface area subjected to the fluid flow cross section. The faces of the pad preferably are parallel to each other and in particular also parallel to the first and second faces of the flow channel particulate filtration media. Accordingly, the gas adsorbing filtration media of the combination filter according to the invention does not have a pleated structure but may have first and second opposite faces at least one of which is provided with structures (e.g. protrusions and recesses) in order to increase the surface area affected by the fluid to be filtered.

In particular, according to a preferred embodiment of the invention, the flow channel particulate filtration media is formed by at least one structured film layer and a second layer, the structured film layer having a first face and a second face, at least one face of the structured film layer forming, at least in part, said flow channels and having high aspect ratio structures over at least a portion of the face forming said flow channels and wherein a second film layer comprising the flow channel layer, or a further layer, at least in part defines ordered fluid pathways through the flow channel particulate filtration media and wherein the film layers are preferably electrostatically charged and define a plurality of inlets open through the first face and a plurality of outlets open through the second face of said flow channel particulate filtration media.

DETAILED DESCRIPTION OF PREFERRED EMBODIMENTS OF THE INVENTION

Figure 1:
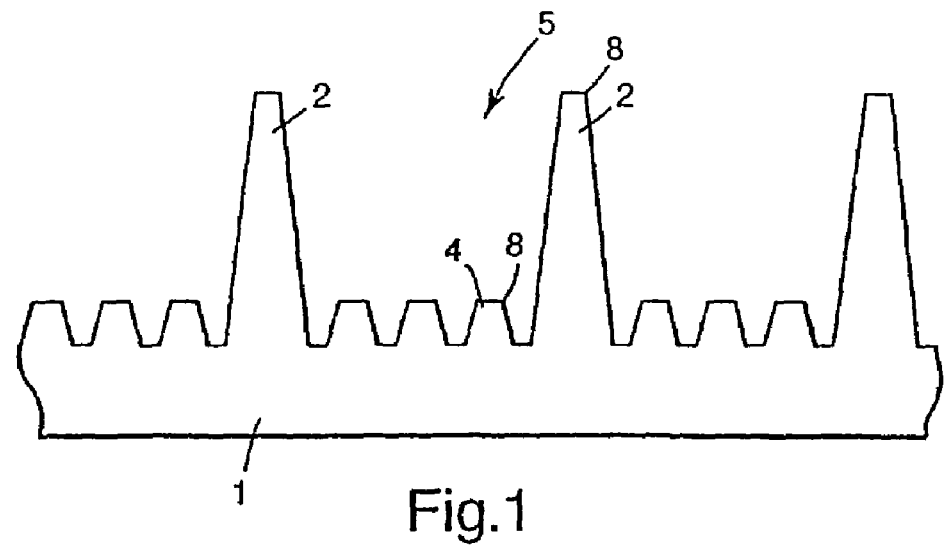
FIG. 1 is a side view of a first structured film useful in forming the flow channel particulate filtration media.
Figure 2:
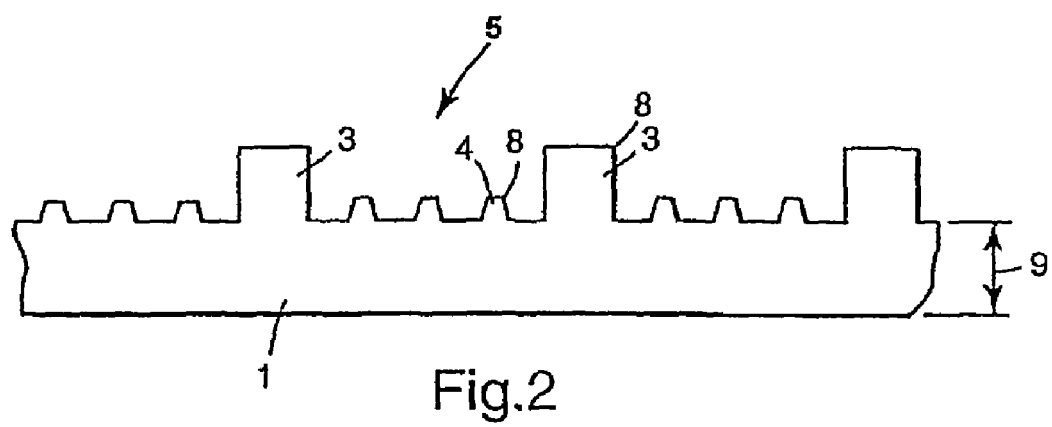
FIG. 2 is a side view of a second structured film useful in forming the flow channel particulate filtration media.
Figure 3:
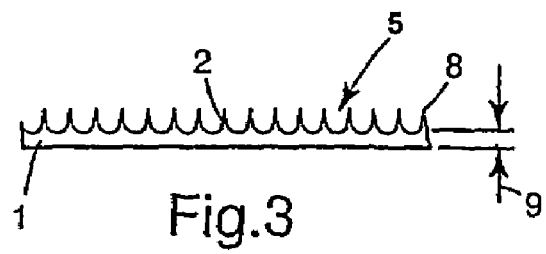
FIG. 3 is a side view of a third structured film useful in forming the flow channel particulate filtration media.
Figure 4:
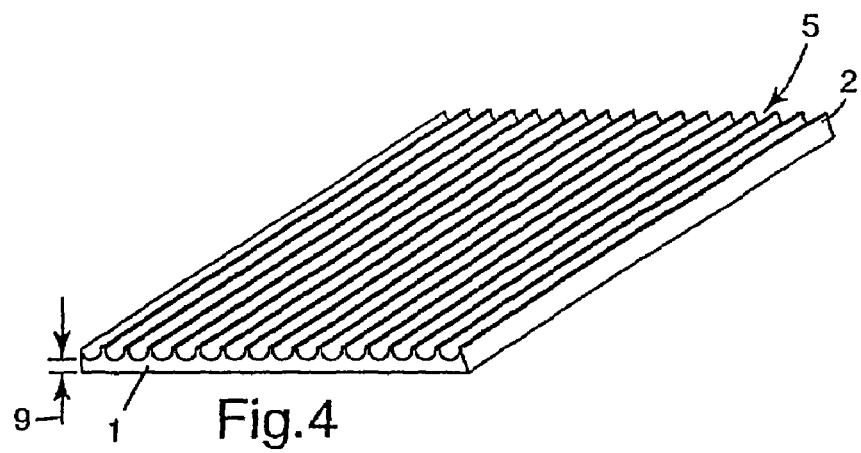
FIG. 4 is a side view of a fourth structured film useful in forming the flow channel particulate filtration media.

The present invention provides a combination filtration media system for filtering fluids comprising a flow channel particulate filtration media and a gas adsorbing filtration media.

The combination filter of the present invention is particularly suitable for use in a vehicle, in particular a motor vehicle, for filtering air entering a passenger cabin of such vehicle.

The gas adsorbing filtration media of the combination filter is provided in the form of a pad having width and length dimensions orthogonal to each other and a thickness dimension substantially parallel to the flow direction. Accordingly, the pad does not provide a pleated structure. The face confronting the flow channel particulate filtration media is substantially flat. Flat in this sense means that the face can also be provided with structures (e.g. protrusions and recesses) in particular in wave shape like form so that the surface area of the pad and, accordingly, the gas adsorbing filtration area is increased. The same flat structure can also be provided at the other face of the pad confronting the face mentioned above.

Accordingly, the pad of the gas adsorbing filtration media is comprised of a layer having an average thickness of preferably between 0.5 cm to several centimeters and, in particular, to 2 cm or 3 cm and extending substantially in a plane generally perpendicular to the flow direction. The length and width dimensions may vary between 100 mm to 400 mm and preferably 150 mm to 250 mm.

The adsorber particles of the gas adsorbing filtration media can be any of the known active adsorber particles capable of removing unwanted substances such as unwanted gases or smells from a fluid stream. Adsorber particles for use in this invention include active carbon particles, synthetic polymer adsorbers, activated resins and zeolites. Generally, the particles will have a size between 0.01 and 2 mm, preferably between 0.05 and 1 mm. The particles may be bonded together by a binder. Preferably, the adsorber particles used in this invention are active carbon particles.

The combination filter will generally have the gas adsorbing filtration media located on the down stream side of the flow channel filtration medium, i.e. the fluid to be filtered will first pass through the flow channel filtration medium and thereafter through the gas adsorbing filtration media.

The gas adsorbing filtration media can be any kind of material suitable for gas adsorbing and, in particular, is comprised of entangled fibers loaded with activated carbon particles adhered thereto by means of a binder or the like. As an alternative, the gas adsorbing filtration media comprises agglomerated activated carbon particles adhered to each other to define a porous structure. This structure can be additionally provided with holes or channels extending therethrough from the inlet face to the outlet face in order to further reduce the flow resistance of the porous structure. Finally, also a gas adsorbing filtration media can be used in which activated carbon particles are attached to a netting structure built from strands of fibers of polypropylene or similar materials or an expanded open cell polyurethane foam. The individual strands as well as carbon particles are adhered to the structure utilizing a binder in particular a resin of the polyurethane group.

The flow channel particulate filtration media of the combination filter is comprised preferably of charged contoured films arranged in a honeycomb structure to form fluid flow pathways. The flow channel particulate filtration media also comprises film layers where at least some of the film layers have high aspect ratio structures such as ribs, stems, fibrils, or other discrete protuberances which extend the surface area of at least one face of the film layer.

Film layers are configured in a flow channel particulate filtration media with the contours of the film layers defining a plurality of inlet openings into fluid pathways through a face of the array. The film layers may have structures defining the fluid pathways or extend therein. The fluid pathways may be defined by a single contoured film layer having a cap film layer, or by adjacent contoured film layers. The fluid pathways further have outlet openings which allow fluid to pass into and through the pathways without necessarily passing through a filter layer having a flow resistance. The fluid pathways and openings of the flow channel particulate filtration media as such are defined by one or more flow channels formed at least in part by the contoured film layers. The flow channels are created by peaks or ridges in the contoured film layer and can be of any suitable form as long as they are arranged to create fluid pathways in conjunction with an adjacent film layer through the flow channel particulate filtration media. For example the flow channels can be separate discrete channels formed by repeating ridges or interconnected channels formed by peak structures. The flow channels could also be isolated channels (e.g., closed valleys surrounded by peaks or ridges) that together with a further contoured film layer define a fluid pathway (e.g. where the valleys on the adjacent contoured film layers are offset to create a continuous tortuous path through the filtration media array).

A plurality of adjacent, either separate or interconnected, flow channels (e.g., a series of flow channels aligned in a row sharing a common contoured film layer) of the flow channel particulate filtration media are preferably defined by a series of peaks or ridges formed by a single contoured film layer. These adjacent flow channels define a flow channel layer. The peaks or ridges in the contoured film layers may be stabilized or separated by a planar or contoured cap layer. A cap layer is a layer which is in engagement, or contact, with the peaks or ridges on one face of the contoured film layers. The peaks or ridges on the opposite face of the contoured film layer can also be joined to or in contact with a cap layer. A cap layer may cover all or only a portion of a contoured film layer. If the cap layer is a planar film layer, the cap film layer and the associated contoured film layer define fluid pathways between adjacent peaks or ridges of the contoured film layer in contact or engagement with the film cap layer.

Figure 8:
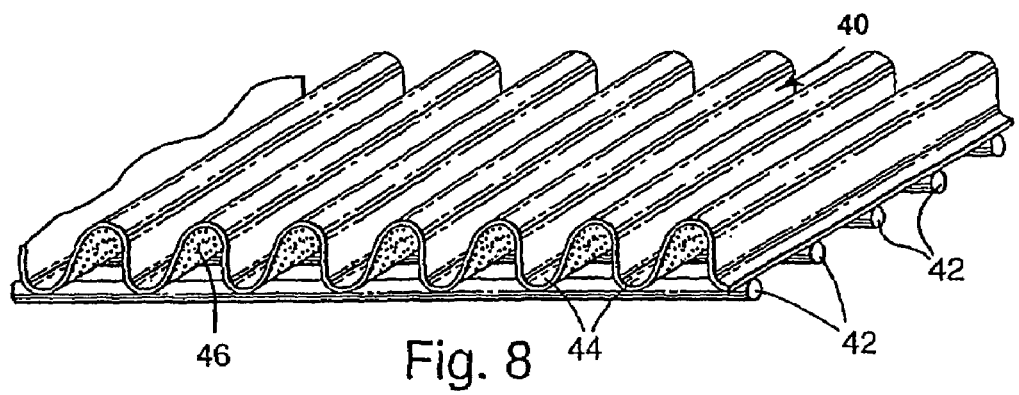
FIG. 8 is a perspective view of a contoured film layer with a stabilization layer of strands.

A cap layer can also be a functional layer such as a sorbent or particulate filter or a stabilization layer such as a series of stabilization filaments or a strengthened nonwoven. FIG. 8 shows a contoured film layer 40 having discrete stemlike structures 46 joined to stabilization filaments 42 at peaks 44 of the contoured film layer 40. In order to be useful as a flow channel particulate filtration media, the FIG. 8 embodiment would need to be joined at a further film layer such as a cap film layer or a further contoured film layer. If a further contoured film layer were joined to the layer of filaments 42, the fluid pathways would be formed from the two flow channel layers of the two adjacent contoured film layers.

Figure 5:
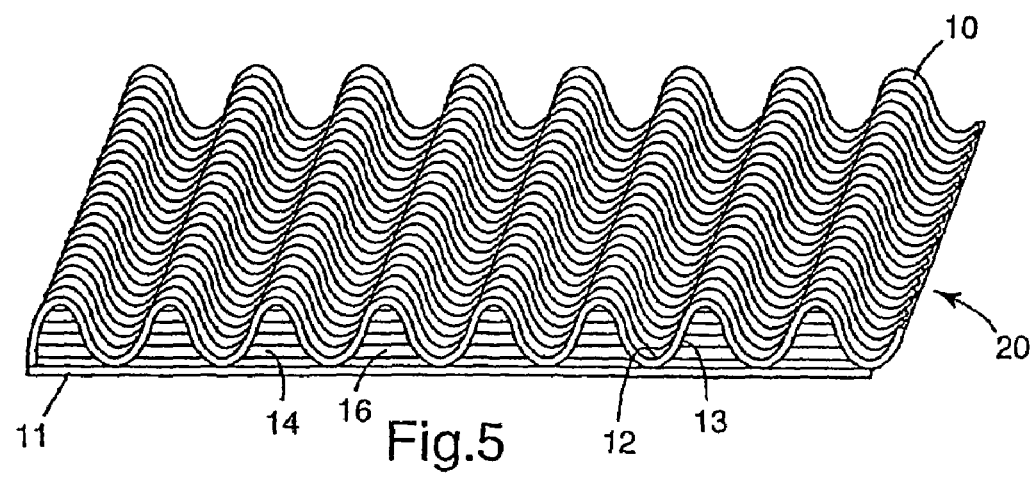
FIG. 5 is a perspective view of a contoured film and flat cap film layer assembly.
Figure 6:
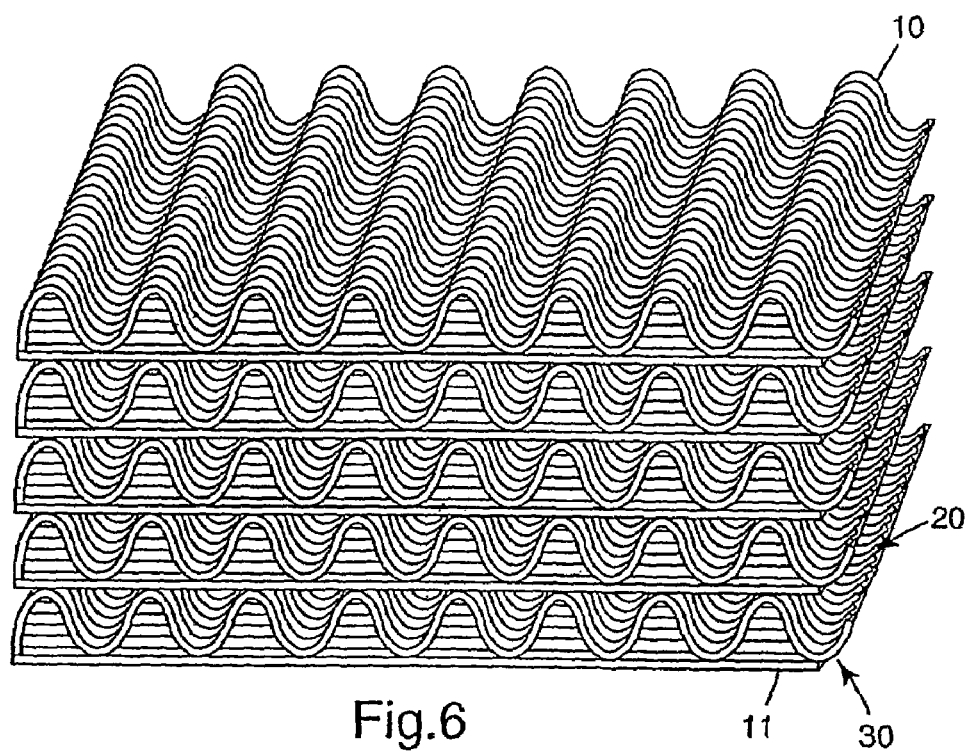
FIG. 6 is a perspective view of a first embodiment of a flow channel particulate filtration media formed of the FIG. 5 assembly.
Figure 9:
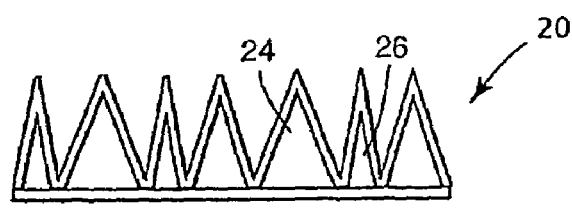
FIG. 9 is a perspective view of a contoured film layer with a flat film cap layer forming a flow channel assembly.
Figure 10:
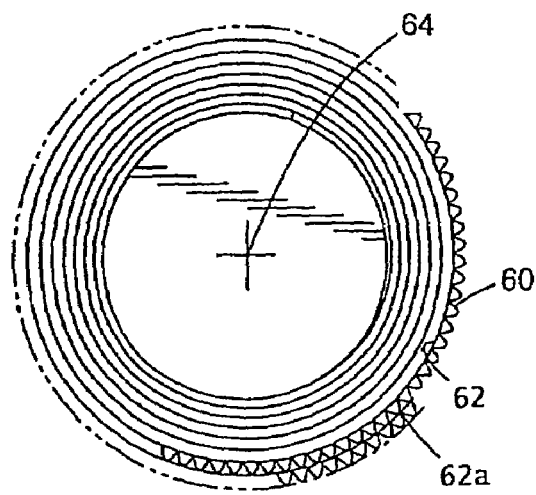
FIG. 10 is a side view of a third embodiment of the flow channel filtration medium.

Adjacent flow channels, e.g., 14 and 16, in a flow channel layer 20, defined by a contoured film layer 10, may be all the same as shown in FIG. 5, or may be different as shown in FIG. 9. In FIG. 9, the adjacent flow channels 24 and 26 of the flow channel layer 20 are separate flow channels, which have the same height but different widths. In FIG. 5 the adjacent flow channels 14 and 16 of the flow channel layer 20 are separate flow channels which have the same height and widths. For manufacturability, preferably all, or at least a majority of the peaks or ridges forming the flow channels of the contoured film layer should have substantially the same height. Further, each adjacent flow channel layer 20 of the flow channel particulate filtration media 30 may have the same flow channel configurations (as shown in FIG. 6), or may be different. The flow channels of adjacent flow channel layers of a flow channel particulate filtration media may also be aligned (e.g., as in FIG. 6), or may be offset (e.g., at angles with respect to each other as in FIG. 7) or some combination thereof. The adjacent overlying flow channel layers of a flow channel particulate filtration media are generally formed from a single contoured film layer where the flow channels can be interconnected, separate, or even separate and isolated (i.e. do not extend across the entire contoured film layer). With flow channels that extend across the entire contoured film layer these channels could extend linearly or curved. Preferably, the flow channels of adjacent overlying flow channel layers are substantially parallel and aligned (FIG. 6), but they could be at diverging or converging angles. If the flow channel particulate filtration media is formed of cylindrically arranged flow channel layers as shown in FIG. 10, these flow channel layers can be formed of a single contoured film layer 60 with an optional cap layer 62 configured in a corkscrew or helical alignment around a central axis 64. The contoured film layer is preferably bonded to one cap layer 62 for stability during manufacturing and in frictional contact with the other cap layers 62a.

Figure 7:
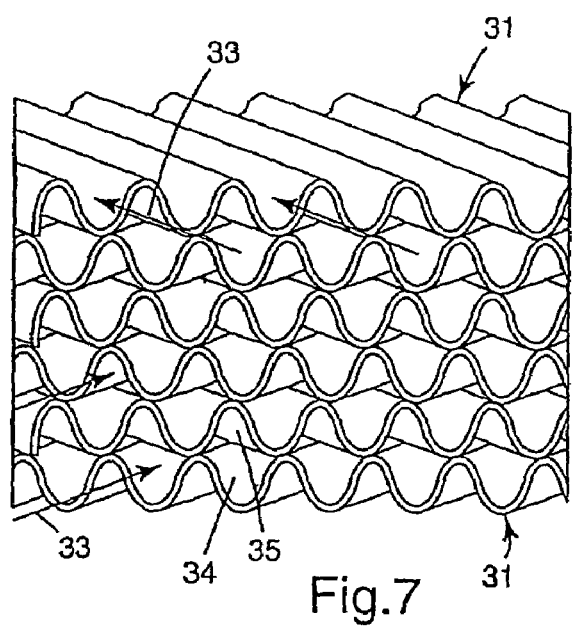
FIG. 7 is a perspective view of a second embodiment of a flow channel particulate filtration media.

Pairs of contoured film layers may face one another with the facing layers engaging one another at their respective peaks as shown in FIG. 7 or be separated by one or more cap layers as shown in FIGS. 5, 6, and 10. When the contoured film layers 31 are in contact without an intervening film layer as shown in FIG. 7, the fluid pathways 33 weave between adjacent intersecting flow channels, e.g., 34 and 35 of the contoured film layers 31.

The flow channels provide controlled and ordered fluid flow pathways through the flow channel particulate filtration media. The amount of surface area available for filtration purposes is determined by available surface area of the flow channels and the number and length of these flow channels in flow channel particulate filtration media. In other words, the features of the individual filtration media layers, such as the length of the flow channels, channel configurations, and the face surface area of the individual layers.

A single layer of flow channels provided by a contoured film layer may comprise a functional flow channel particulate filtration media in accordance with the present invention, however, preferably multiple overlying flow channel layers form the functional flow channel particulate filtration media. A flow channel particulate filtration media formed of stacked contoured structured film layers provides an ordered or engineered and mechanically stable porous structure without the pore size variability and gross irregularities of nonwoven filter webs. Any pore size variability or irregularities are planned and controlled based on the ultimate filtration needs for which the combination filter is intended. As a result, the fluid stream is subjected to uniform treatment as it passes through the flow channels of the flow channel particulate filtration media, thus enhancing its filtering efficiency. Generally, the contoured film layers forming the flow channels reinforce the flow channel particulate filtration media forming a structurally stable form which can be formed into a multitude of self supporting configurations.

The flow channel particulate filtration media may be conformed into a variety of shapes or laid over objects without crushing and closing the flow channels. The contoured films are electrostaticly charged while contoured in association with any attached cap layer or other layer. These layered charged contoured films are characterized by surface voltages of at least +/−1.5 KV, preferable at least +/−10 KV, measured approximately one centimeter from the film surface by an electrostatic surface voltmeter (ESVM), such as a model 341 Auto Bi-Polar ESVM, available from Trek Inc., Medina, N.Y. The electrostatic charge may comprise an electret, which is a piece of dielectric material that exhibits an electrical charge that persists for extended time periods. Electret chargeable materials include nonpolar polymers such as polytetrafluoroethylene (PTFE) and polypropylene. Generally, the net charge on an electret is zero or close to zero and its fields are due to charge separation and not caused by a net charge. Through the proper selection of materials and treatments, an electret can be configured that produces an external electrostatic field. Such an electret can be considered an electrostatic analog of a permanent magnet.

Several methods are commonly used to charge dielectric materials, any of which may be used to charge a contoured film layer or other layers used in the flow channel particulate filtration media, including corona discharge, heating and cooling the material in the presence of a charged field, contact electrification, spraying the web with charged particles, and wetting or impinging a surface with water jets or water droplet streams. In addition, the chargeability of the surface may be enhanced by the use of blended materials or charge enhancing additives. Examples of charging methods are disclosed in the following patents: U.S. Pat. No. RE 30,782 to van Turnhout et al., U.S. Pat. No. RE 31,285 to van Turnhout et al., U.S. Pat. No. 5,496,507 to Angadjivand et al., U.S. Pat. No. 5,472,481 to Jones et al., U.S. Pat. No. 4,215,682 to Kubik et al., U.S. Pat. No. 5,057,710 to Nishiura et al. and U.S. Pat. No. 4,592,815 to Nakao.

In addition, one or more layers could also have active charging such as by the use of a film, with a metallized surface or layer on one face that has a high voltage applied to it. This could be accomplished in the present invention by the addition of such metallized layer adjacent to a contoured layer, or the application of a metal coating on a layer. Flow channel filtration medium layers comprising such metallized layers could then be mounted in contact with an electrical voltage source resulting in electrical flow through the metallized media layers. Examples of active charging are disclosed in U.S. Pat. No. 5,405,434 to Inculet.

Another type of treatment available is the use of fluorochemical additives in the form of material additions or material coatings which can improve a filter layer's ability to repel oil and water, as well as enhance the ability to filter oily aerosols. Examples of such additives are found in U.S. Pat. No. 5,472,481 to Jones et al., U.S. Pat. No. 5,099,026 to Crater et al., and U.S. Pat. No. 5,025,052 to Crater et al.

Polymers useful in forming a structured film layer used in the present invention include but are not limited to polyolefins such as polyethylene and polyethylene copolymers, polypropylene and polypropylene copolymers, polyvinylidene difluoride (PVDF), and polytetrafluoroethylene (PTFE). Other polymeric materials include acetates, cellulose ethers, polyvinyl alcohols, polysaccharides, polyesters, polyamides, poly(vinyl chloride), polyurethanes, polyureas, polycarbonates, and polystyrene. Structured film layers can be cast from curable resin materials such as acrylates or epoxies and cured through free radical pathways promoted chemically, by exposure to heat, UV, or electron beam radiation. Preferably, the structured film layers are formed of polymeric material capable of being charged namely dielectric polymers and blends such as polyolefins or polystyrenes.

Polymeric materials including polymer blends can be modified through melt blending of plasticizing active agents or antimicrobial agents. Surface modification of a filter layer can be accomplished through vapor deposition or covalent grafting of functional moieties using ionizing radiation. Methods and techniques for graft-polymerization of monomers onto polypropylene, for example, by ionizing radiation are disclosed in U.S. Pat. Nos. 4,950,549 and 5,078,925. The polymers may also contain additives that impart various properties into the polymeric structured layer.

Figure 11:
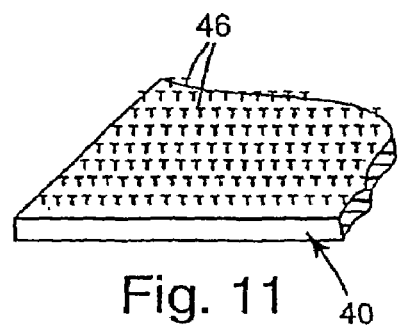
FIG. 11 is a perspective view of a fourth structured film useful in forming the flow channel particulate filtration media.

The contoured film layers and cap film layers may have structured surfaces defined on one or both faces. The high aspect ratio structures used on the contoured film and/or cap film layers of the preferred embodiments generally are structures where the ratio of the height to the smallest diameter or width is greater than 0.1, preferably greater than 0.5 theoretically up to infinity, where the structure has a height of at least about 20 microns and preferably at least 50 microns. If the height of the high aspect ratio structure is greater than 2000 microns the film can become difficult to handle and it is preferable that the height of the structures is less than 1000 microns. The height of the structures is in any case at least about 50 percent or less, of the height of the flow channels, preferably 20 percent or less. As shown in FIGS. 1–4 and 11 the structures 8 on the film layers 1 can be in the shape of upstanding stems or projections, e.g., pyramids, cube corners, J-hooks, mushroom heads, or the like; continuous or intermittent ridges; e.g., rectangular 3 or v-shaped ridges 2 with intervening channels 5; or combinations thereof. Mushroom head projections 46 are shown in FIG. 11 on film backing 40. These projections can be regular, random or intermittent or be combined with other structures such as ridges. The ridge type structures 8 can be regular, random intermittent, extend parallel to one another, or be at intersecting or nonintersecting angles and be combined with other structures between the ridges, such as nested ridges 4 or projections. Generally, the high aspect ratio structures 8 can extend over all or just a region of a film 1. When present in a film region, the structures provide a surface area at least 50 percent higher than a corresponding planar film, preferably at least 100 percent higher, generally up to 1000 percent or higher. In a preferred embodiment, the high aspect ratio structures are continuous or intermittent ridges that extend across a substantial portion of the contoured film layer at an angle to the contours, preferably octagonal (90 degrees) to the contours of the contoured film layer as shown in FIGS. 5 and 6. This reinforces the mechanical stability of the contoured film layer in the flow channel assembly (FIG. 5) and the filtration media array (FIG. 6). The ridges generally can be at an angle of from about 5 to 175 degrees relative to the contours, preferably 45 to 135, generally the ridges only need to extend over a significant curved region of the contoured film.

The structured surfaces can be made by any known method of forming a structured film, such as the methods disclosed in U.S. Pat. Nos. 5,069,404 and 5,133,516, both to Marantic et al.; U.S. Pat. No. 5,691,846 to Benson et al.; U.S. Pat. No. 5,514,120 to Johnston et al.; U.S. Pat. No. 5,158,030 to Noreen et al.; U.S. Pat. No. 5,175,030 to Lu et al.; U.S. Pat. No. 4,668,558 to Barber; U.S. Pat. No. 4,775,310 to Fisher; U.S. Pat. No. 3,594,863 to Erb or U.S. Pat. No. 5,077,870 to Melbye et al. These methods are all incorporated by reference in their entirety.

The contoured film layers are preferably provided with a high aspect ratio structure over at least 50 percent of at least one face, preferably at least 90 percent. Cap film layers or other functional film layers can also be formed of these high aspect ratio structured films. Generally the overall flow channels should have structured surfaces forming 10 to 100 percent of its surface area, preferably 40 to 100 percent.

Figure 5A:
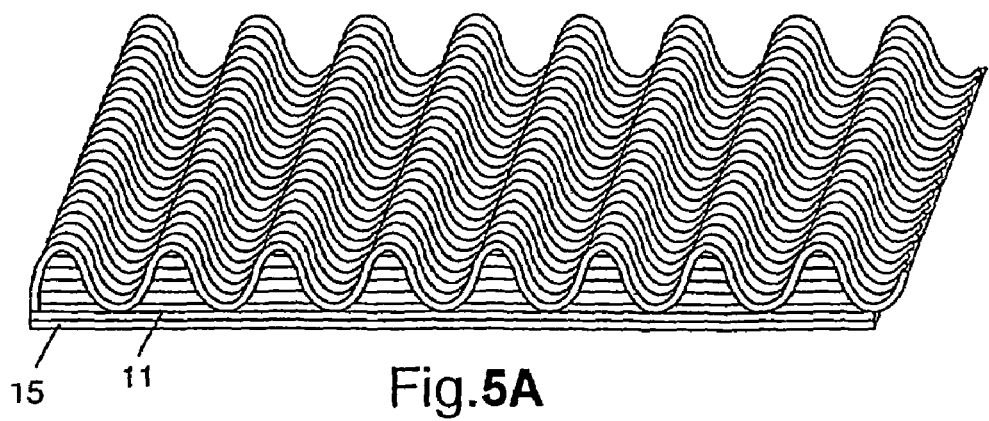
FIG. 5A is a perspective view of a contoured film and flat cap film layer assembly with an additional functional layer.

The flow channel particulate filtration media of the present invention starts with the desired materials from which the layers are to be formed. Suitable sheets of these materials having the required thickness or thicknesses are formed with the desired high aspect ratio surfaces and at least one of these film layers is contoured and this contoured film is stabilized by being joined to a further cap layer, a contoured layer or the like, forming the flow channels. The flow channel layers forming the flow channel particulate filtration media, e.g., contoured film layers and cap layers, may be bonded together, mechanically contained or otherwise held into a stable flow channel particulate filtration media. The contoured film and cap layers may be bonded together such as disclosed in U.S. Pat. No. 5,256,231 (extrusion bonding a film layer to a corrugated layer) or U.S. Pat. No. 5,256,231 (by adhesive or ultrasonic bonding of peaks to an underlying layer), or by melt adhering the outer edges forming the inlet and/or outlet openings. As shown in FIG. 5 a contoured structured film 10 is joined to a planar structured cap film layer 11 at the peaks 12 on one face 13 of the contoured film layer 10. One or more of these flow channel layers 20 is then stacked or otherwise layered and are oriented in a predetermined pattern or relationship, with optionally additional layers 15 (FIG. 5A), to build up a suitable volume of flow channel layers 20 in a flow channel particulate filtration media 30 as shown in FIG. 6. The resulting volume of flow channel layers 20 is then converted, by slicing or otherwise, into a finished flow channel particulate filtration media of a desired thickness and shape. Any desired treatments, as described above, may be applied at any appropriate stage of the manufacturing process.

The flow channel particulate filtration media 30 is preferably formed into its final form by slicing the array with a hot wire. The hot wire fuses the respective layers together as the final filter form is being cut. This fusing of the layers is at the outermost face or faces of the final filter. As such at least some of the adjacent layers of the flow channel particulate filtration media 30 need not be joined together prior to the hot wire cutting. The hot wire cutter speed can be adjusted to cause more or less melting or fusing of the respective layers. For example, the hot wire speed could be varied to create higher or lower fused zones. Hot wires could be straight or curved to create filters of an unlimited number potential shapes including rectangular, curved, oval, or the like. Also, hot wires could be used to fuse the respective layers of the flow channel particulate filtration media without cutting or separating filters. For example, a hot wire could cut through the flow channel particulate filtration media fusing the layers together while maintaining the pieces on either side of the hot wire together. The pieces refuse together as they cool, creating a stable flow channel particulate filtration media.

Preferred embodiments of the invention use thin flexible polymer films having a thickness 9 of less than 200 microns, preferably less than 100 microns down to about 5 microns. Thicker films are possible but generally increase pressure drop without any added benefit to filtration performance or mechanical stability. The thickness of the other layers are likewise preferably less than 200 microns, most preferably less than 100 microns. The thickness of the layers forming the flow channel particulate filtration media generally are such that cumulatively less than 50 percent of the cross sectional area of the flow channel particulate filtration media at the inlet or outlet openings is formed by the layer materials, preferably less than 10 percent. The remaining portions of the cross sectional area form the inlet openings or outlet openings. The peaks or ridges of the contoured film generally have a minimum height of about 1 mm, preferably at least 1.2 mm and most preferably at least 1.5 mm. If the peaks or ridges are greater than about 10 mm the structures become unstable and efficiency is quite low except for very long flow channel particulate filtration medias, e.g. greater than 100 cm or longer; preferably the peaks or ridges are 6 mm or less. The flow channels generally have an average cross sectional area along their length of at least about 1 mm$^2$ preferably at least 2 mm$^2$ where preferably a minimum cross sectional area is at least 0.2 mm$^2$, preferably at least 0.5 mm$^2$. The maximum cross sectional area is determined by the relative filtration efficiency required and is generally about 1 cm$^2$ or less, preferably about 0.5 mm$^2$ or less.

The shape of the flow channels is defined by the contours of the contoured film layer and the overlying cap layer or adjacent attached contoured film layer. Generally the flow channel can be any suitable shape, such as bell shaped, triangular, rectangular or irregular in shape. The flow channels of a single flow channel layer are preferably substantially parallel and continuous across the contoured film layer. However, flow channels of this type on adjacent flow channel layers can be at angles relative to each other. Also, these flow channels of specific flow channel layers can extend at angles relative to the inlet opening face or outlet opening face of the flow channel particulate filtration media.

The flow channel particulate filtration media is preferably from 8 to 35 mm thick from the first face to the second face of the array. It has been found that when the thickness is less than 8 mm, existing safety regulations for motor vehicles may not be met. When the size exceeds 35 mm, the combination filter may be too bulky to fit easily in the housing provided therefor in the motor vehicle.

The flow channel particulate filtration media and the gas adsorbing filtration media may be formed into the combination filter in any of the conventional ways. For example, the gas adsorbing filtration media may be glued to the flow channel filtration medium by gluing the pleat tips of the pleated gas adsorbing filtration media to the flow channel particulate filtration media. Preferably however, the flow channel particulate filtration media and the gas adsorbing filtration media will be held together by a pair of strips along two opposing ends of the combination filter. Such strips can be glued to the ends of the flow channel particulate filtration media and the gas adsorbing filtration media thereby holding both together in the combination filter. Such strips can be made of any material such as for example plastic and they can be rigid as well as flexible or compressible. In accordance with a particular embodiment, the strips can be flexible and compressible such as, for example, a strip of foam or non-woven. The use of such a strip will have the advantage that it could also function as a sealing against the housing in which the combination filter is to be fitted.

According to a particularly preferred embodiment, the flow channel filtration medium and gas adsorbing filtration media will be held together by providing a frame around the periphery of the combination filter. Such frame is preferably glued to the ends of the flow channel filtration medium and the gas adsorbing filtration media. The frame can be rigid and may be made of plastic or any other suitable material. Preferably, the frame is comprised of a flexible and compressible material that can function as a frame as well as a sealing. Such materials include for example foams and non-woven materials. Thanks to the rigidity and stability of the flow channel particulate filtration media, the frame does not need to be rigid and even a fairly flexible material such as a foam can be used as the frame.

Figure 12:
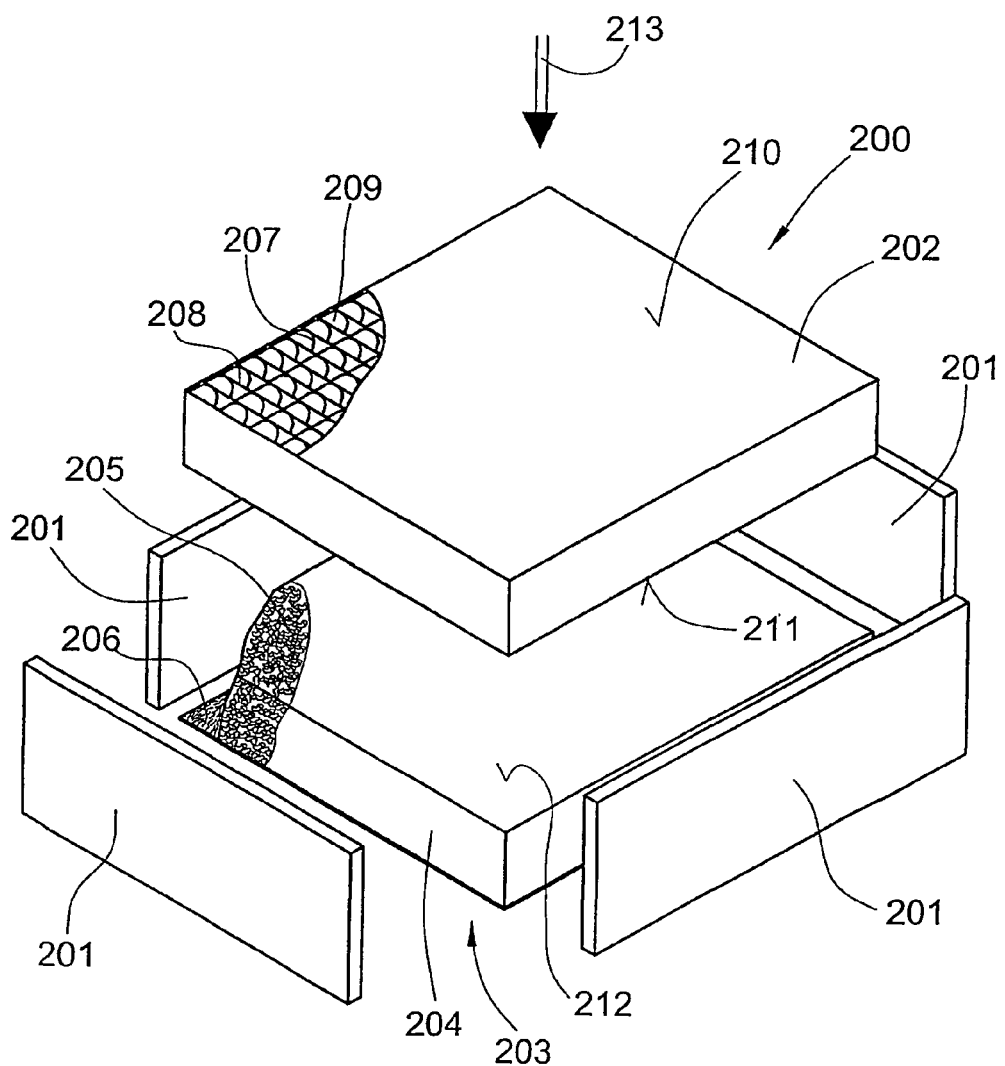
FIG. 12 is a schematic representation of a combination filter according to a first embodiment.

FIG. 12 shows a first embodiment of a combination filter. This combination filter 200 includes a frame preferably comprised of frame portions 201 which are made of foam and which are glued to the lateral sides of a flow channel particulate filtration media 202 and a gas adsorbing filtration media 203. However, the frame can be made of any material suitable as a filter holding frame. As can be seen from FIG. 12, the gas adsorbing filtration media 203 comprises a pad 204 having a layer of constant thickness in the flow direction throughout its width and length dimensions. The pad 204 comprises gas adsorbing particles 205 adhered to each other by a suitable binder so that the pad 204 builds a porous layer. A layer of scrim 206 is arranged at that face of the pad 204 facing away from the flow channel particulate filtration media 202.

As shown in FIG. 12, the flow channel particulate filtration media 202 is made up of a stack of contoured film layers 207 and substantially flat layers 208 arranged alternatingly. These layers 207 and 208 are electrostatically charged. At least one of the layers on at least one of its sides is structured. Contoured film layers 207 and straight film layers 208 define flow channels 209 that extend from one face 210 of the flow channel particulate filtration media 202 to its opposite face 211. In use, face 210 will define the inlet and the layer of scrim 206 will define the outlet of the combination filter 200 with face 211 of the flow channel particulate filtration media 202 facing and contacting face 212 of the pad 204 which face 212 is opposite to the layer of scrim 206 of the gas adsorbing filtration media 203. Accordingly, the unfiltered fluid when flowing in flow direction 213 will enter at face 206 and move through the flow channel particulate filtration media 202 first and will then flow through the pad 204 of the gas adsorbing filtration media 203. The pad 204 may comprise holes or channels (not shown) extending through the layer of the pad in flow direction 213. The number of holes or channels per cm$^2$ is around 50 to 200 and in particular 100 with the diameter of the holes or channels about 0.5 to 2 mm and in particular 1 mm.

Figure 13:
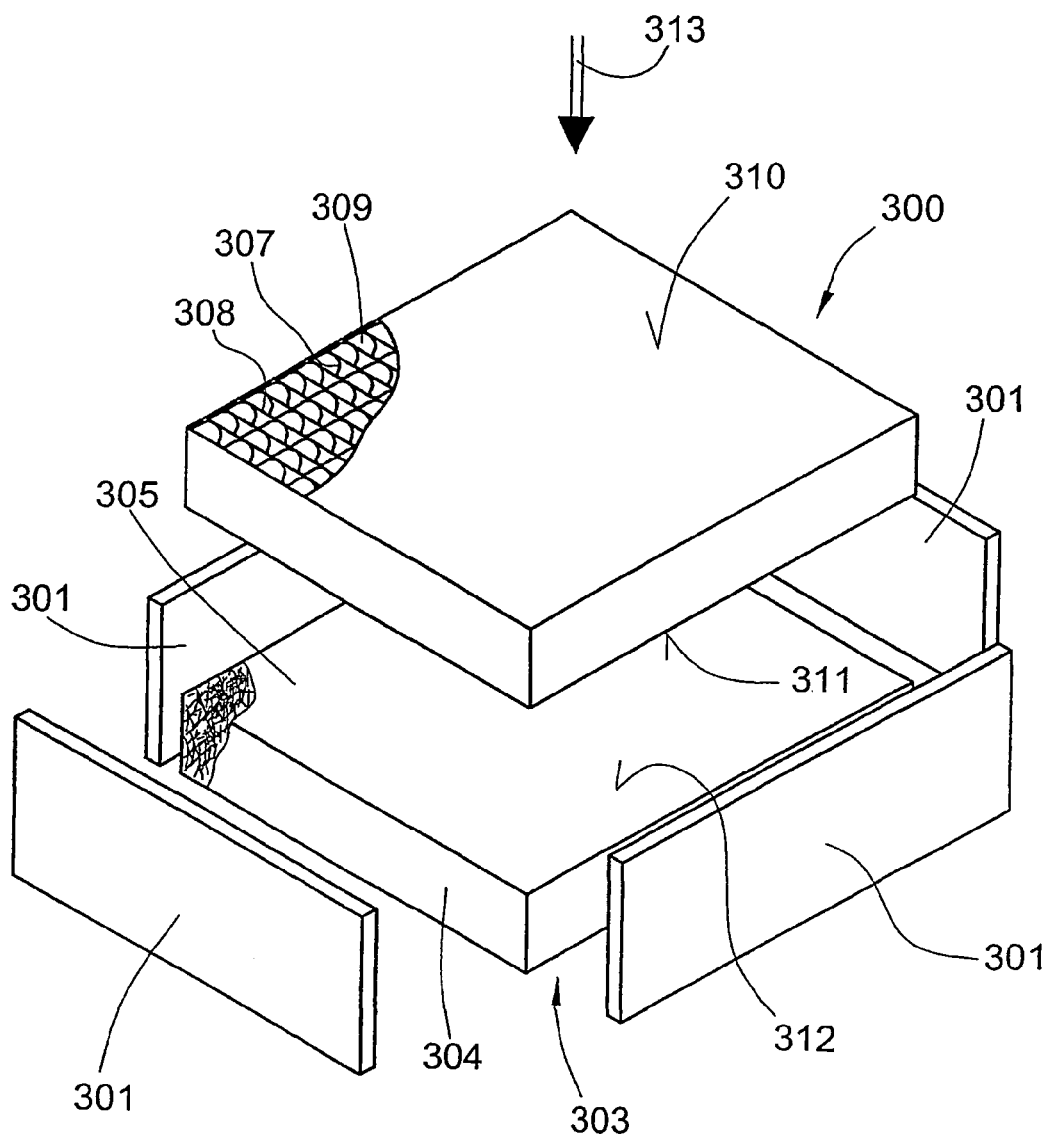
FIG. 13 is a schematic representation of a combination filter according to a second embodiment.

FIG. 13 shows an alternative of a combination filter 300 which is similar to the combination filter 200 of FIG. 12 and differs from that combination filter by the material of the pad 304 of the gas adsorbing filtration media 303. In FIG. 13 the same reference numerals as in FIG. 12 are used for the same parts but increased by 100.

In contrast to FIG. 12, the pad 304 of the combination filter 300 of FIG. 13 comprises nonwoven web of fibers 305 which are entangled and loaded with gas adsorbing material (not shown) bonded to the fibers by for example an adhesive or binder.

The following examples are intended to further illustrate the invention without however the intention to limit the invention thereto.

EXAMPLES

The invention will be further described by the following examples and test results:

Example 1

The flow channel particulate filtration media of a combination filter was produced using the following method: Polypropylene resin was formed into a structured film using standard extrusion techniques by extruding the resin onto a casting roll with a micro-grooved surface. The resulting cast film had a first smooth major surface and a second structured major surface with longitudinally arranged continuous features from the casting roll. The features on the film consisted of evenly spaced first primary structures and interlaced secondary structures. The primary structures were spaced 150 microns apart and had a substantially rectangular cross-section that was about 75 microns tall and about 80 microns wide (a height/width ratio of about 1) at the base with a side wall draft of about 5°. Three secondary structures having substantially rectangular cross-sections that were 25 microns tall and 26 microns wide at the base (height/width ratio of about 1) were evenly spaced between the primary structures at 26 micron intervals. The base film layer from which these features extended was 50 microns thick.

A first layer of structured film was corrugated into a contoured shape and attached at its arcuate peaks to a second structured film to form a flow channel laminate layer assembly. The method generally comprises forming the first structured film into a contoured sheet forming the film so that it has arcuate portions projecting in the same direction from spaced generally parallel anchor portions and bonding the spaced generally parallel anchor portions of the contoured film to a second structured film backing layer with the arcuate portions of the contoured film projecting from the backing layer. This method is performed by providing first and second heated corrugated members or rollers each having an axis and including a plurality of circumferentially spaced generally axially extending ridges around and defining its periphery, with the ridges having outer surfaces and defining spaces between the ridges adapted to receive portions of the ridges of the other corrugating member in mashing relationship. The first structured film is fed between the mashed ridges with the corrugating members are counterrotated.

With the corrugating apparatus configured in this manner the structure film when passed through the inter-mashing teeth of the corrugating members at a roll speed of 5.3 rpm was compressed into and retained between the gear teeth of the upper corrugation member. With the first film registered in the teeth of the upper corrugation member the second structured film was laid over the periphery of the roll and was ultrasonically welded to the layer retained in the teeth of the upper corrugation member. Welding was accomplished between the first and second film at the top surface of the teeth of the corrugation member by employing the tooth surface as an anvil against which an ultrasonic horn was brought to bear. The thus formed corrugated flow channels were 1.8 mm in height with a base width of 2.5 mm.

The flow channel layer assembly was electret charged by exposure to a high voltage field in a grid charger by the method generally described in U.S. Pat. No. 3,998,916 (van Turnhout). A particulate filtration media was formed from the charged flow channel layer assemblies by stacking layers on top of one another maintaining the channels in all the flow channel layers in a parallel alignment such that the flow channel walls formed a 90° angle with a plane defined by the inlet opening phase of the flow channel particulate filtration media (90° incident angle). A filtration media array stack was converted into a stable filtration media array construction by hot-wire cutting the stack to produce filters 10 mm in depth. The amount of melting induced by the hot wire and the degree of smearing of melted resin was carefully controlled so as not to obstruct the inlet or outlet openings of the filtration media array. In addition to producing the desired filter depth the hot-wire cutting process also stabilized the final assembly into a robust collapse resistant structure by fusing the front and rear phases of flow-channel layer assemblies together forming a stabilized filtration media array. For the combination filter system an array with the external dimensions of 255×190 mm was created.

The second component of the combination filter, the gas adsorbing filtration media was provided as a nonwoven layer of 255×190 mm width and length dimensions and 12 mm thickness. The layer was comprised of entangled fibers loaded with activated carbon adhered to the fibers. The parameters of the gas adsorbing filtration media layer were as follows:

| | |
|---|---|
| Weight [g/m$^2$]: | 2090 ± 12% |
| Thickness [mm]: | 12 |
| Fibers: | |
| Weight [g/m$^2$]: | 420 ± 10% |
| Share of the fibers by mass [%]: | 20 |
| Material of Fibers: | Polyamide 6.6 |
| Adhesive: | pressure sensitive adhesive RD-914 of Minnesota Mining and Manufacturing Company |
| Weight [g/m$^2$]: | 390 ± 20% |
| Share of the adhesive by mass [%]: | 19 |
| Activated Carbon: | 25 × 45 meshes per inch, GG, Carbontetrachloride capacity (CTC) 80 |
| Weight [g/m$^2$]: | 1280 ± 10% |
| Share of the activated carbon by mass [%]: | 61 |

The flow channel particulate filtration media having a thickness of 10 mm was placed onto the layer of gas adsorbing filtration media having a thickness of 12 mm so that a configuration of a total thickness of 22 mm was obtained. This configuration was then placed into a frame. For this frame a closed cell polyurethane foam was used having a height of 22 mm and a thickness of 6 mm. On one side of the foam a double sided adhesive tape was applied with a liner which was subsequently removed. The foam with the layer of adhesive material was then applied onto the configuration of the flow channel particulate filtration media and the gas adsorbing filtration media so that a frame was created. The frame was built up from four different pieces for each of the four sides, however, alternatively also a single strip of foam having the length of the entire circumference could also be used. With the application of the foam and due to the rigidity of the flow channel particulate filtration media a stable configuration was obtained without the two filtration media being directly adhered to each other.

Simultaneously this frame is also capable of taking over the sealing function of the entire combination filter.

Example 2

For this combination filter the same flow channel particulate filtration media was used as in Example 1 and specified above.

For the gas adsorbing filtration media agglomerates were prepared, 110 grams of treated activated carbon granules, 12×20 mesh (coconut derived activated GG carbon available from Kuraray in Okayama, Japan) were heated at 165° C. for 45 minutes. The granules were treated with an aqueous solution of $K_2CO_3$ to improve the absorption of acid gas. These heated granules were then dry-mixed with 20 grams of polyurethane of a particle size in the range of 50–225 microns (Morton PS 455-100, MORTON-THIOKOL, Seabrooke, N.H.) for 24 seconds in a mechanical mixer. The resultant carbon granule agglomerates adhered with binder particles were sieved through a series of sieves with mesh sizes between 7–12. The sieved agglomerates were then layered loosely in a mold with the dimensions 255×190 mm and heated at 165° C. for 40 minutes without compression. This results in a thickness of 12 mm and an average density of 0.25 grams per ccm. Further details of the method of preparation can be taken from EP-B-0 652 803.

Example 3

For this combination filter the same flow channel particulate filtration media and gas adsorbing filtration media of Example 2 were used except for the porous layer of agglomerated carbon particles was provided with channels extending in the flow direction. 400 of channels having a diameter of 1 mm were homogeneously distributed across the width and length dimensions of the layer.

Comparative Example

The Comparative Example was a pleated construction using a conventional electret filter layer instead of the flow channel particulate filtration media. A four layer laminate was created and subsequently pleated. As a particulate filter the following was used: A scrim layer similar to the ones used in Example 1 was used comprising a non-woven spun-bonded material produced in a known manner from fibers being multiply thermally bonded and randomly arranged. The basis weight of this non-woven spun-bonded material was 10 g/m². The spun-bonded web was combined with a non-woven material of the electret filter material consisting of electrostatically charged dielectric fibrillated or split fibers with the typical dimensions of 10 by 40 microns in cross-section. The basis weight of this non-woven material was about 40 g/m². As materials for this electret filter layer products distributed under the designation of 3M Filtrete™ by the Minnesota, Mining and Manufacturing Company can be used.

The two other layers were practically identical to two layers of Example 1 namely the adsorber particle layer as described above having a thickness of 2 mm onto which a scrim layer was attached in the same manner using an adhesive of the polyurethane group. The two configurations namely the electret filter layer with the additional scrim layer on one side and the adsorber particle layer with its scrim layer on the other side were then laminated together so that the electret filter layer was brought into direct contact with the adsorber particle layer without using an adhesive. Accordingly, the two scrim layers were at the two outer surfaces of the entire construction.

This configuration was then pleated in essentially the same manner as described above creating a pleat height of 28 mm and an overall dimension of 255×190 mm resulting in a total of 20 pleats so that the total area of the active material was 0.21 m² comparable to the total area of Example 1 which was 0.22 m². The pleated configuration was then placed into a frame preferably through an injection molding process.

With the above described sample filters the following comparative measurements were conducted:

The efficiency was measured in accordance with the test norm DIN 71 460, part 1. The measurement of the efficiency is conducted as follows: A test dust "coarse" according to DIN ISO 5011 is introduced according to § 4.4 of DIN 71 460. This dust is measured with particle counters prior and after the entry through the filter to be tested. The particle counters have the capability of determining particles of different particle sizes ranging between 0.5 and 15 microns at least. The ratio within this particle range then is the efficiency in percent. All provisions according to DIN 71 460, § 1-4.4.2, were taken into account. It is particularly important that the filters to be tested are identical in size and configuration as stated above for the different examples. Furthermore, the captured dust was determined for Example 1 in comparison with the Comparative Example. Also in this case the tests were conducted following the test norm DIN 71 460 part 1. The determination was conducted as follows: All provisions of DIN 71 460, part 1, were taken into account which are relevant for the determination of the captured dust, especially § 6.3. The measurement was carried out from the beginning until the pressure drop had been increased at the given rates of 25, 50, 75 and 100 Pa respectively. The filters were weighed prior and after the test. For the weighing also DIN ISO 5011 was to be applied.

The gas efficiency was determined in accordance with the test norm DIN 71 460, part 2. The filter to be tested is inserted into a test setup according to appendix A, figure A.1. In this case the test material either N-butane, $SO_2$ or toluene is introduced into the system in gaseous form. The temperature is determined and the concentration of the test material is determined prior and after the passage through the filter. Simultaneously the pressure drop is measured. The concentration of the test material prior to the entry into the filter is $C_1$, the corresponding concentration after the passage through the filter is $C_2$. This is a function of the time, the test material is passing through the filter ($C_2$ (t)) while the concentration prior to the entry of the test material through the filter is constant with the time. The efficiency is then determined by $$E_{(t)} = (1 - C_{2(t)} : C_1) * 100\%$$

As the filter is typically loaded up with the test material, the efficiency goes down with the time. For practical reasons it has been proven that it is sufficient to indicate the different gas efficiencies immediately after the test has started and the filter has begun to adsorb the test material (this means the gas efficiency after 0 minutes) and the gas efficiency after 5 minutes. Furthermore the flow rate has to be taken into account which was 225 m³/h.

These tests were conducted with a number of samples in order to ensure the reproducibility and the main results can be seen from the following table. This table gives a comparison between examples 1, 2, 3, and the comparative example. From the table it can be seen that the pressure drop increase over the amount of dust by which the combination filters are loaded is much lower in case of examples 1, 2, and 3 than in case of the comparative example. That means that not only the dust collection capability of the combination filters of examples 1, 2, and 3 are improved over the combination filter of the comparative example but also the life time is improved which is substantially longer for the combination filter according to examples 1 to 3 than in case of the comparative example.

The superior particle filtration performance of the flow channel particulate filtration media of the combination filters of examples 1 to 3 is maintained in the presence of the gas adsorbing filtration media i.e. is not influenced by the layer of gas adsorbing filtration media. The performance of the gas adsorbing filtration media can be seen from the lower part of the table showing as an example the gas adsorbing performance based on the gas efficiency for the test gas Toluene.

|  | Example 1 | Example 2 | Example 3 | Comparative Example |
|---|---|---|---|---|
| particle filtration performance | | | | |
| increase of pressure drop when loaded with 20 g dust | 10 Pa | 17 Pa | 3 Pa | 73 Pa |
| increase of pressure drop when loaded with 35 g dust | 17 Pa | >40 Pa | 6 Pa | >>125 Pa |
| gas adsorbing performance | | | | |
| Toluene after 0 min (initial) | 69 | 78 | 63 | 83 |
| Toluene after 5 min (initial) | 65 | 75 | 60 | 76 |

The invention claimed is:

1. A combination filter for filtering fluids flowing in a flow direction, comprising
   a flow channel particulate filtration media having a first face and a second face and
   a gas adsorbing filtration media,
   wherein said flow channel particulate filtration media comprises a plurality of flow channels directed in a flow direction and defined by inner surfaces, said flow channels having inlet openings through the first face and outlet openings through the second face of said flow channel particulate filtration media,
   wherein the inner surfaces of said flow channels at least in part are provided with
      structures protruding therefrom and forming the flow channels or extending into the flow channels or
      an electrical charge or
      a combination of both and
   wherein said gas adsorbing filtration media comprises a pad having a first face and a second face and width and length dimensions orthogonal with respect to each other and each individually to the flow direction and having a thickness dimension in the flow direction, said pad comprising a layer extending substantially perpendicular to the flow direction across the width and length dimensions of said pad.

2. A combination filter according to claim 1,
   wherein said flow channel particulate filtration media is formed by at least one structured film layer and a second layer, the structured film layer having a first face and a second face, at least one face of the structured film layer forming, at least in part, said flow channels and having high aspect ratio structures over at least a portion of the face forming said flow channels and wherein a second film layer comprising the flow channel layer, or a further layer, at least in part defines ordered fluid pathways through said flow channel particulate filtration media and
   wherein said film layers define a plurality of inlets open through the first face and a plurality of outlets open through the second face of said flow channel particulate filtration media.

3. A combination filter according to claim 2 wherein at least one of the film layers in contoured to form said flow channels.

4. A combination filter according to claim 1 wherein one of the faces of said pad of said gas adsorbing filtration media is adjacent to the second face of said flow channel particulate filtration media.

5. A combination filter according to claim 1 wherein said pad of said gas adsorbing filtration media includes a porous structure of adsorber particles connected to each other.

6. A combination filter according to claim 1 wherein the first and second faces of the pad of the gas adsorbing filtration media or the flow channel particulate filtration media or of both the pad of the gas adsorbing filtration media and the flow channel particulate filtration media are parallel to each other.

7. A combination filter according to claim 1 wherein said pad of said gas adsorbing filtration media includes a nonwoven web of entangled fibers loaded with a gas adsorbing material.

8. A combination filter according to claim 7 wherein the fibers have a diameter of from about 50 to 500 microns.

9. A combination filter according to claim 1 wherein said pad comprises holes or channels extending from the first face to the second face of said pad.

10. A combination filter according to claim 1 wherein said gas adsorbing filtration media further includes at least one scrim layer arranged at one of the faces of said pad and wherein said flow channel particulate filtration media and said gas adsorbing filtration media are arranged such that said at least one scrim layer faces the first face of said flow channel particulate filtration media or is arranged so as to face away from the second face of said flow channel particulate filtration media.

11. A combination filter according to claim 1 wherein said pad of said gas adsorbing filtration media has a thickness of 5 to 30 mm.

12. A combination filter according to claim 1 wherein said flow channel particulate filtration media has a thickness of 8 to 35 mm.

13. A combination filter according to claim 1 further comprising at least two strips adhered at opposing edges of said gas adsorbing filtration media and said flow channel particulate filtration media.

14. A combination filter according to claim 13 wherein said strips comprise an adhesive tape.

15. A combination filter according to claim 13 wherein said strips comprise a foam.

16. A combination filter according to claim 1 wherein said gas adsorbing filtration media and said flow channel particulate filtration media are surrounded by a frame at their periphery.

17. A combination filter according to claim 1 wherein the first face or second face or both faces of said gas adsorbing filtration media are corrugated.

18. A combination filter according to claim 1 wherein said gas adsorbing filtration media comprise active carbon particles.

19. Vehicle comprising a passenger cabin and including a combination filter as defined in claim 1 for filtering air entering into the passenger cabin.

20. Method of filtering a fluid comprising causing said fluid to pass through a combination filter as defined in claim 1.

21. Method according to claim 20 wherein said fluid is a gaseous fluid.

22. Method according to claim 20 wherein said fluid is first passed through said flow channel filtration medium and then through said gas adsorbing filtration media.

* * * * *